United States Patent
Donescu et al.

(10) Patent No.: US 10,968,897 B2
(45) Date of Patent: Apr. 6, 2021

(54) METHODS AND APPARATUS FOR SERVICING WIND TURBINE COMPONENTS THROUGH A LOWER PORTION OF A TOWER

(71) Applicant: Vestas Wind Systems A/S, Aarhus N. (DK)

(72) Inventors: Victor Donescu, Westford, MA (US); Jacob Karottki Falk Andersen, Oslo (NO); Erland Falk Hansen, Mørke (DK)

(73) Assignee: Vestas Wind Systems A/S, Aarhus N. (DK)

( * ) Notice: Subject to any disclaimer, the term of this patent is extended or adjusted under 35 U.S.C. 154(b) by 160 days.

(21) Appl. No.: 16/380,467

(22) Filed: Apr. 10, 2019

(65) Prior Publication Data
US 2019/0264661 A1    Aug. 29, 2019

Related U.S. Application Data

(63) Continuation of application No. 14/008,392, filed as application No. PCT/DK2012/050096 on Mar. 28, 2012, now Pat. No. 10,302,070.
(Continued)

(30) Foreign Application Priority Data

Apr. 6, 2011   (DK) .......................... PA 2011 70164

(51) Int. Cl.
*F03D 11/04*    (2006.01)
*F03D 80/50*    (2016.01)
(Continued)

(52) U.S. Cl.
CPC .......... *F03D 80/50* (2016.05); *E02B 17/0004* (2013.01); *E02B 17/027* (2013.01);
(Continued)

(58) Field of Classification Search
CPC ........ F03D 11/045; F03D 11/04; F03D 80/82; F03D 80/50; F03D 1/003; Y02E 10/72; Y02E 10/727; Y02E 10/728
See application file for complete search history.

(56) References Cited

U.S. PATENT DOCUMENTS

2005/0134050 A1    6/2005   Salls
2007/0296220 A1*  12/2007   Kristensen .............. F03D 13/10
                                                               290/55
(Continued)

FOREIGN PATENT DOCUMENTS

WO    2004099606 A1    11/2004
WO    2010098815 A1    9/2010

OTHER PUBLICATIONS

European Patent Office, Official Action issued in Application No. 12 712 914.6, dated Aug. 28, 2015.
(Continued)

*Primary Examiner* — Woody A Lee, Jr.
*Assistant Examiner* — Maxime M Adjagbe
(74) *Attorney, Agent, or Firm* — Wood Herron & Evans LLP

(57) ABSTRACT

A wind turbine tower is supported on a transition piece that connects the tower to a foundation and that defines a space beneath the lower end of the tower. Electronic components positioned within a removable module in the lower portion of a wind turbine tower may be removed through a lower end of the tower for service or replacement.

16 Claims, 6 Drawing Sheets

Related U.S. Application Data

(60) Provisional application No. 61/469,433, filed on Mar. 30, 2011.

(51) Int. Cl.
*E02B 17/02* (2006.01)
*F03D 13/20* (2016.01)
*F03D 80/80* (2016.01)
*E02B 17/00* (2006.01)
*E04H 12/00* (2006.01)

(52) U.S. Cl.
CPC ............. *F03D 13/22* (2016.05); *F03D 80/82* (2016.05); *E02B 2017/0091* (2013.01); *E04H 2012/006* (2013.01); *F05B 2240/912* (2013.01); *F05B 2240/95* (2013.01); *Y02E 10/72* (2013.01); *Y02E 10/727* (2013.01); *Y02E 10/728* (2013.01)

(56) References Cited

U.S. PATENT DOCUMENTS

| | | | |
|---|---|---|---|
| 2009/0223139 A1* | 9/2009 | Meiners | F03D 80/80 52/40 |
| 2009/0322085 A1 | 12/2009 | Renaud | |
| 2010/0135792 A1* | 6/2010 | Niehues | F03D 13/20 416/1 |

OTHER PUBLICATIONS

Danish Patent Office, DK Combined Search and Examination Report issued in corresponding DK Application No. PA 2011 70164, dated Dec. 15, 2011.

International Searching Authority, Search Report and Written Opinion issued in corresponding International Application No. PCT/DK2012/050096, dated Nov. 7, 2012.

\* cited by examiner

METHODS AND APPARATUS FOR SERVICING WIND TURBINE COMPONENTS THROUGH A LOWER PORTION OF A TOWER

CROSS REFERENCE TO RELATED APPLICATIONS

This application is a continuation of U.S. patent application Ser. No. 14/008,392, filed Jan. 29, 2014 (pending), which is a U.S. National Phase Application of International Application No. PCT/DK2012/050096, filed Mar. 28, 2012 (expired), which claimed the benefit of U.S. Provisional Application Ser. No. 61/469,433, filed Mar. 30, 2011 (expired) and Denmark Patent Application No. PA 2011 70164, filed Apr. 6, 2011, the disclosures of which are incorporated by reference herein in their entirety.

FIELD

The field is that of wind turbines and more particularly methods and apparatus for servicing a wind turbine through a lower portion of a wind turbine tower.

BACKGROUND

Electronics used in the operation of a wind turbine, including converters, transformers, switch gear, and various component controllers, have been positioned in different locations, including in separate structures at ground level, in the nacelle of the wind turbine, and in the tower of the wind turbine. Each of these arrangements presents different benefits and drawbacks.

Placement of electronics within the lower portion of a wind turbine tower has proven beneficial in removing weight from the upper end of the wind turbine without having to place components in an additional structure, not normally associated with the wind turbine. Service and/or replacement of electrical components within the lower end of a tower, however, has posed issues.

The outer jacket of a wind turbine tower provides structural strength needed to support the weight and loads of the entire wind turbine. Some of the greatest loads are experienced at the base of the tower, where electronics are sometimes located. Moreover, some of the electronic components that may be positioned within the lower portion of the tower may be rather large, such as transformer and other equipment. Substantial support structures may be required to accommodate an opening large enough to allow the passageway of many electronic components, if such openings are even feasible.

SUMMARY

Aspects of the invention relate to the service and/or replacement of electronic components that are positioned within the lower portion of a wind turbine tower. According to some aspects, the tower may be supported on a transition piece that connects the tower to a foundation and that defines a space beneath the lower end of the tower. The electronic components may be positioned within a module that may be removed through a lower end of the tower for service or replacement.

According to a first aspect of the invention, a wind turbine construction is disclosed that includes a tower that supports a nacelle and rotor of a wind turbine. The tower includes a structural jacket, an interior space internal to the structural jacket that has an interior cross-sectional area. A first removable electronics module is positioned within the interior space of the tower. A support structure is also disclosed that supports and elevates the tower to provide a space below a lower end of the tower for receiving the first removable electronics module from the interior space of the tower.

According to another aspect of the invention, a method of servicing electronics of a wind turbine is disclosed. The method includes releasing a first removable electronics module from a fixed position within an interior space of a wind turbine tower. The first removable electronics module is moved downward through the interior space of the tower. The first removable electronics module is also moved into in a space below a lower end of the tower and within a support structure that supports and elevates the tower.

BRIEF DESCRIPTION OF THE DRAWINGS

The accompanying drawings are not intended to be drawn to scale. In the drawings, each identical or nearly identical component that is illustrated in various figures may be represented by a like numeral or similar text. For purposes of clarity, not every component may be labelled in every drawing. In the drawings.

DETAILED DESCRIPTION OF THE FIGURES AND VARIOUS EMBODIMENTS

Figure 1:
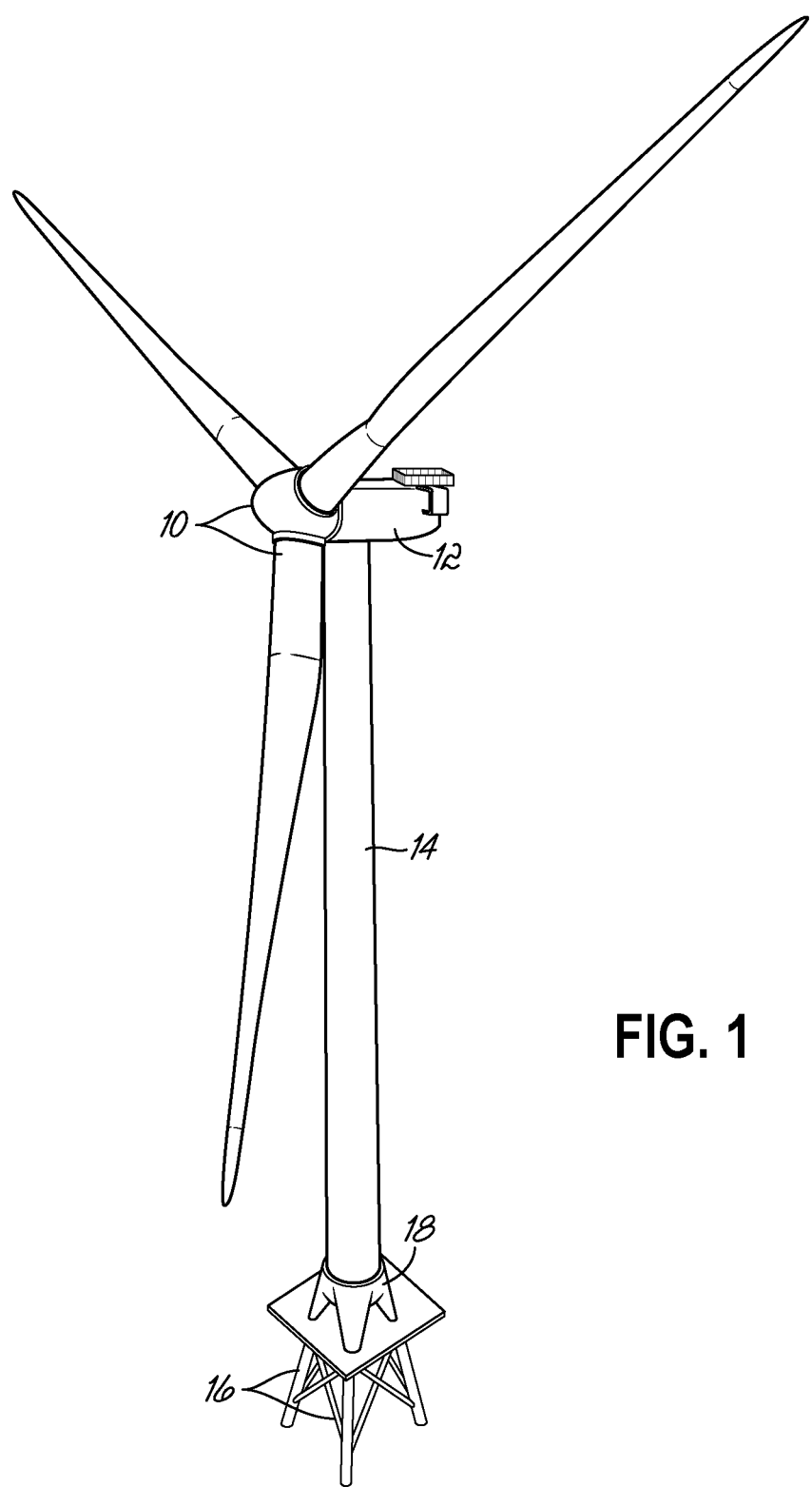
FIG. 1 shows a perspective view of a wind turbine that incorporates various features described herein, according to one embodiment.

Wind turbines, such as shown in FIG. 1, are typically constructed with a rotor 10 that is faced into the wind so that that rotor 10 may be driven by the wind to harvest energy therefrom. The rotor 10 is supported by a nacelle 12 that is rotatably mounted on a tower 14. For offshore applications a foundation 16 may extend from the seabed to above sea level to provide a supported mounting for the tower 14. A transition piece 18, as shown in FIG. 1, may provide a mounting interface between an upper portion of the foundation 16 and the lower portion of the tower 14.

Wind turbines include various types of electronic equipment that may help convert mechanical energy of the rotor into electrical energy delivered by the wind turbine, including but not limited to generators, converters, inverters, transformers, switch gear, and various controllers for wind turbine components. To reduce weight in the nacelle of a turbine and to improve accessibility, some or all of the electronic equipment may be located within the tower of a wind turbine or even at the base level of the wind turbine. Aspects of the invention relate to features and processes for locating electronics within a tower in a manner that provides improved serviceability.

According to some aspects of the invention, electronics are arranged within modules positioned inside of a lower portion of the tower. The modules, or portions thereof, may be removed from the tower for service and/or replacement by being moved downward through an opening in the tower and into a space that lies beneath the tower. In this respect, access may be more easily provided to components within the tower interior.

According to some aspects of the invention, the modules that hold electronics within the tower interior are shaped and sized to facilitate movement of large electronics components from a tower while also fitting within standard shipping containers that may be used to transport the modules over land or sea.

Figure 2:
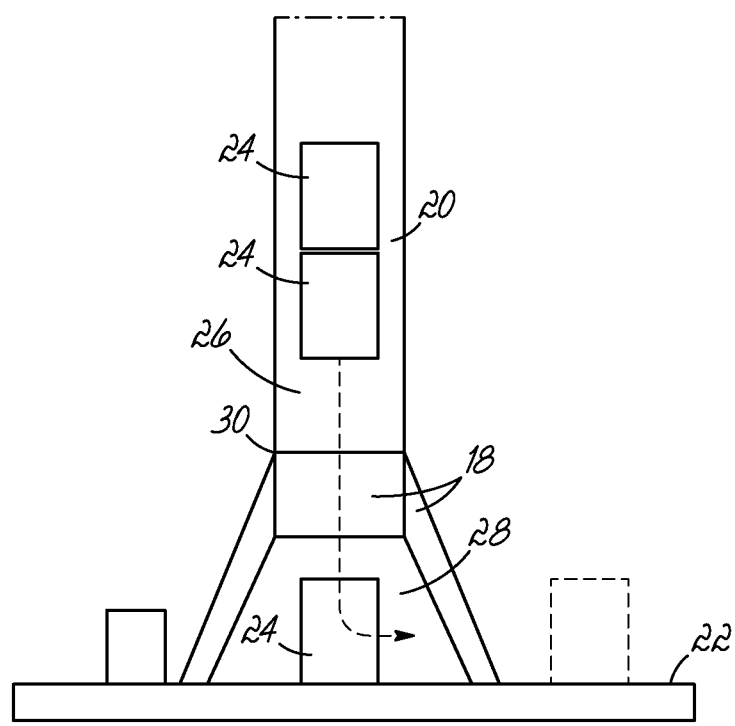
FIG. 2 is a schematic view, showing a tower and a transition piece that provides a space beneath the tower that may receive components from an opening in lower portion of the tower.

FIG. 2 shows a schematic view of a lower portion 20 of a tower, a transition piece 18 that supports the tower, and a working deck 22 of a foundation 16 that supports the transition piece 18. Three electronics modules 24 may be positioned within the interior 16 of the tower in a stacked arrangement, although one module is shown removed from the tower interior. A space 28 is provided below a lower end 30 of the tower and between portions of transition piece 18 and the working deck 22 to receive electronics modules 24 from the tower. Each of the electronics modules may be moved sequentially from within the tower into the space 28 and then to other portions of the working deck 22 for service and/or replacement, as reflected schematically in FIG. 2.

It is to be appreciated that the term "transition piece", as used herein, refers generally to a structure that supports a tower or tower section of a wind turbine and that provides a space to receive components from an above tower or tower section. The term "tower support structure" is used equivalently herein to refer to a transition piece and the term "transition piece: is merely, for the sake of convenience, described herein in use with offshore wind turbine applications for providing a structural connection between a tower and a foundation that lies on the seabed and extends to a position above the sea. It is to be appreciated, however, that transition pieces may also find use in offshore applications where a wind turbine tower is mounted on a floating foundation, in on shore applications, and even in hybrid tower applications were a tower section is supported below by a lattice tower section, or other types of tower sections. The aspects of the invention described herein are also application to these other types of applications, and for use with a wide variety of types of foundations.

Figure 3:
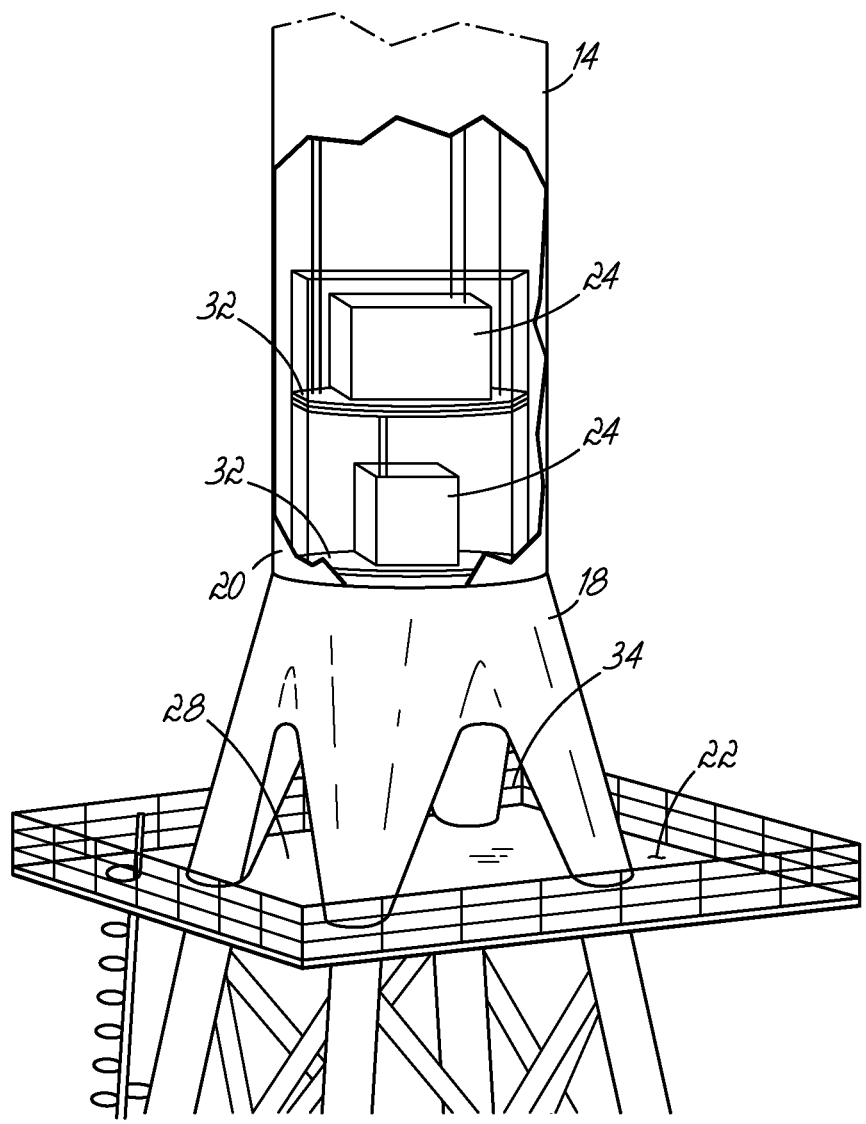
FIG. 3 is a partial, cross-sectional view showing a removable electronics module internal to a lower portion of a tower and a transition piece that supports the tower on a foundation, according to one embodiment.

FIG. 3 shows a tower 14, a transition piece 18, and a working deck 22 according to one embodiment that may allow service and/or replacement of electronics modules 24 through a space 28 below the tower. As shown, the lower portion 20 of the tower houses two modules 24, each comprising a separate floor 32 in the tower. Various mechanisms, as discussed herein, may be used to lower the module(s) into the space 28. The space is sized to accommodate at least one replaceable electronics module 24 and to have at least one lateral opening 34 that allows the module to move along the deck 22, out of the space 28, according to some embodiments. Additionally or alternatively, the deck may be constructed to allow a module to pass through an opening (not shown) in the deck and to or from a ship moored beneath the tower. The space 28 under the tower and lateral openings 34 to the external environment may be sized to allow the largest of the removable modules 24 to pass there through. According to some embodiments, the module have height and width dimensions up to those normally associated with standard shipping containers (2.44 meters× 2.59 meters), although other dimensions are also possible and are contemplated.

The working deck 22, as is also shown in FIG. 3, includes areas to receive removable modules 24 that are to be supplied to or removed from the space 28 beneath the tower. In this respect, the working deck may act as a staging area for modules to be moved between the tower and a ship for transport. The deck and/or space beneath the tower may also provide a space where personnel may access components to work on directly. According to some embodiments, the deck may include rails or ways (not shown) to facilitate easier movement of a module along the deck surface. Additionally or alternatively, rollers or other mechanisms (not shown) may be included with or placed on the bottom of a module to assist in moving the module along the deck surface.

Figure 4:
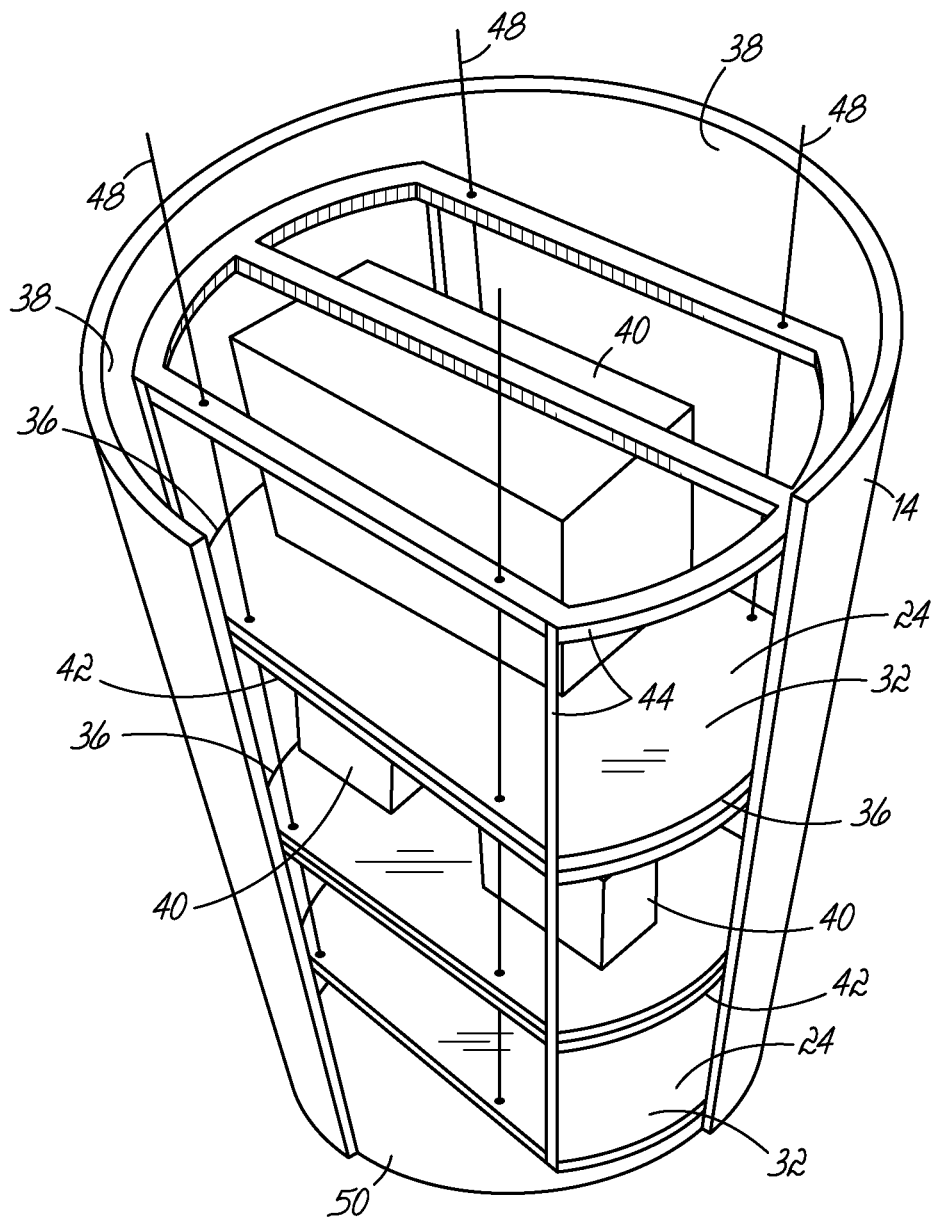
FIG. 4 is a cut-away, perspective view of three, stacked electronics modules within a tower, showing passageways on either side of the electronics modules, according to one embodiment.

FIG. 4 shows cutaway, perspective view of three removable modules 24 that house electronic components 40 stacked within the interior of a tower 14, according to one embodiment. As may be seen, the modules substantially conform, at opposed ends 36, to the cylindrical inner surface 38 of the tower jacket. At other positions, spaces are provided between the removable modules 24 and the inner wall 38 of the tower jacket. These spaces may be used to allow the passage of personnel or components up or down the tower, either with the assistance of hoist, ladder, or mechanical lift, as discussed in greater detail herein. As illustrated, each of the modules occupies approximately 75% of the cross-sectional area (as viewed from above) available within the tower. Other proportions are however also possible, including modules that occupy less than 75% of the available space, such as 50% of the space or less, or more than 75% of the available space, up to and including all of the available space.

As shown in FIG. 4, each of the modules 24 includes an independent floor 32 and ceiling 42, connected to one another by a supporting framework 44. Electrical components 40, such as a transformer, a converter, a wind turbine controller, a switch gear, and the like, may be mounted to or otherwise supported by a floor 32 or other structure of a module. The floors and ceilings of adjacent modules 24 may be fastened to one another, according to some embodiments, to provide additional strength to the overall stack. Additionally or alternatively, each of the modules may be rigidly connected to other features within the tower interior, such as a lower flange of the lowest tower section, an upper flange of the lower tower section, a flange of the transition piece, or other available supports.

The modules shown in FIG. 4 may be mounted within the tower according to different schemes. In some embodiments, the modules may each be independently mounted within the tower. In this respect, each of the modules may be independently released from a fixed position within the tower to allow movement downward into the space below the tower for service and/or replacement. Alternately, multiple modules or the entire stack of modules maybe be mounted to the interior of the tower with a common mechanism. In such embodiments, the multiple modules may be moved downward together, until a second position is reached where a portion of the multiple modules may again be fixed to prevent downward motion, while allowing the lower most module to be removed for service and/or replacement.

According to some embodiments, it is also possible to remove electronics from a module without also removing an entire module from the interior of the tower. For instance, electronic components or other components within a module may be lowered through the tower in the space that lies between the inner surface of the tower wall and the module, according to some embodiments. Alternatively, passageways may be provided directly through the modules to accommodate movement of components to or from the interior space of the tower. According to yet another embodiment, a portion of the floor of a module, such as the lower most module, may be configured to be lowered through the lower end of the tower to provide for service or replacement of components positioned on the portion of the floor.

Figure 5:
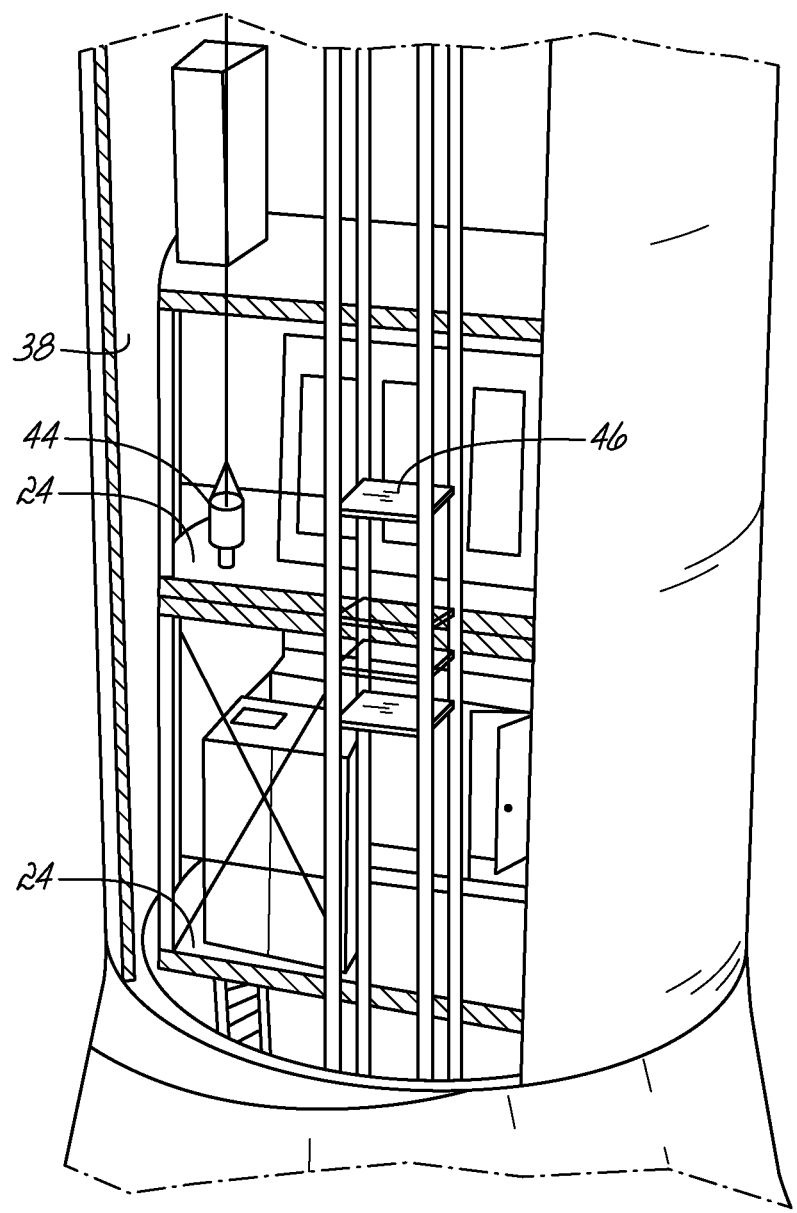
FIG. 5 is a cut-away view of a tower showing stacked electronics modules and mechanical lift, according to one embodiment.

FIG. 5 shows a cross-sectional view of a pair of modules 24 located within a lower tower section, according to one embodiment. As with the embodiment of FIG. 4, space is provided between the interior 38 of the tower wall and the modules 24 to allow passage of components and/or personnel. As shown, a yaw gear 44 is being hoisted through the tower from above, in a space that lies between the modules 24 and the interior 38 of the tower jacket wall. Also shown is a mechanical lift 46 that may be used to move components and/or personnel vertically through the interior of the tower. Although these features are shown passing through a space that lies between the modules and the jacket wall of the tower, other options are also possible and contemplated, such as embodiments that include passageways through the modules to allow movement of components or personnel.

Various types of mechanisms may be used to allow movement of a module through a tower and/or into the space below the tower. According to one embodiment, as shown in FIG. 4, cables 48 may be used to lower individual modules or a group of modules downward through the tower and/or into the space below the tower. The cables may be supported at different points within the tower, such as flanges at the top of the lower tower section. A common set of cables may extend to each of the modules within the tower, or each module may be associated with a common set of cables. According to one embodiment, an upper module that lies on top of a lower module may have a slightly smaller footprint to provide clearance for cables that support the lower module. It is to be appreciated that the cable support system described above may act as a sole support for the modules within the tower, in operation of the wind turbine, or in combination with other supports that secure the modules to the interior of the tower. Alternatively, the modules may be wholly supported within the tower by other structures, with the cables only being used when a module is to be hoisted between the interior of the tower and the space below the tower. Additionally, according to some embodiments, the cable system may be used both for hoisting modules through the interior of the tower and between the lower end of the tower and the space below, rather than simply through the interior of the tower.

According to some embodiments, a guideway (not shown) may be positioned within the interior of the tower to assist in movement of the module(s) there through. The guideway may simply include one or more skid surfaces that direct the modules toward the central portion of the tower and away from tower flanges, as the modules are lowered or raised. Additionally or alternatively, guide features, including rollers or one or more cutaways that receive the guideway(s) may be included within the modules to help direct the modules in movement. According to some embodiments, the guideways may include a rack having gear teeth that engage a pinion on the module. Movement of the pinion may be controlled to, in turn, control movement of the module through the tower.

Movement of a module 24 into the space 28 below the tower may be controlled by the same or different mechanism that controls movement of the module through the tower. By way of example, according to some embodiments, the guideways described herein may extend into the space to help guide modules until contact is made with the deck beneath the space. According to other embodiments, the guideways may end at the lower end of the tower. Similarly, any hoists used to raise or lower modules through the lower end of the tower may also act to lower the module onto the deck that lies below the lower end of the tower. Alternatively, a lift positioned on the deck may receive a module and guide the module downward to the deck, as aspects of the invention are not limited in this respect.

The lower end of the tower, through which a module may be lowered, may include a cover, as shown in FIG. 4. According to some embodiments, the lower end of the tower includes a cover that maybe removed to allow the passage of a removable module. The cover may simply be held in place by brackets and threaded fasteners, according to some embodiments, or may include more complex hinged arrangements. Alternatively, the lower cover may be an integral portion of the lower end of the tower that may be removed by cutting or welding in the event that a module is to be removed for service. According to various embodiments, removal of the cover provides an at least partially downward facing opening through which a module may be moved. It is also to be appreciated that, according to some embodiments, the lower end of the tower may not include a cover, but rather be permanently open to the space that lies below.

Figure 6:
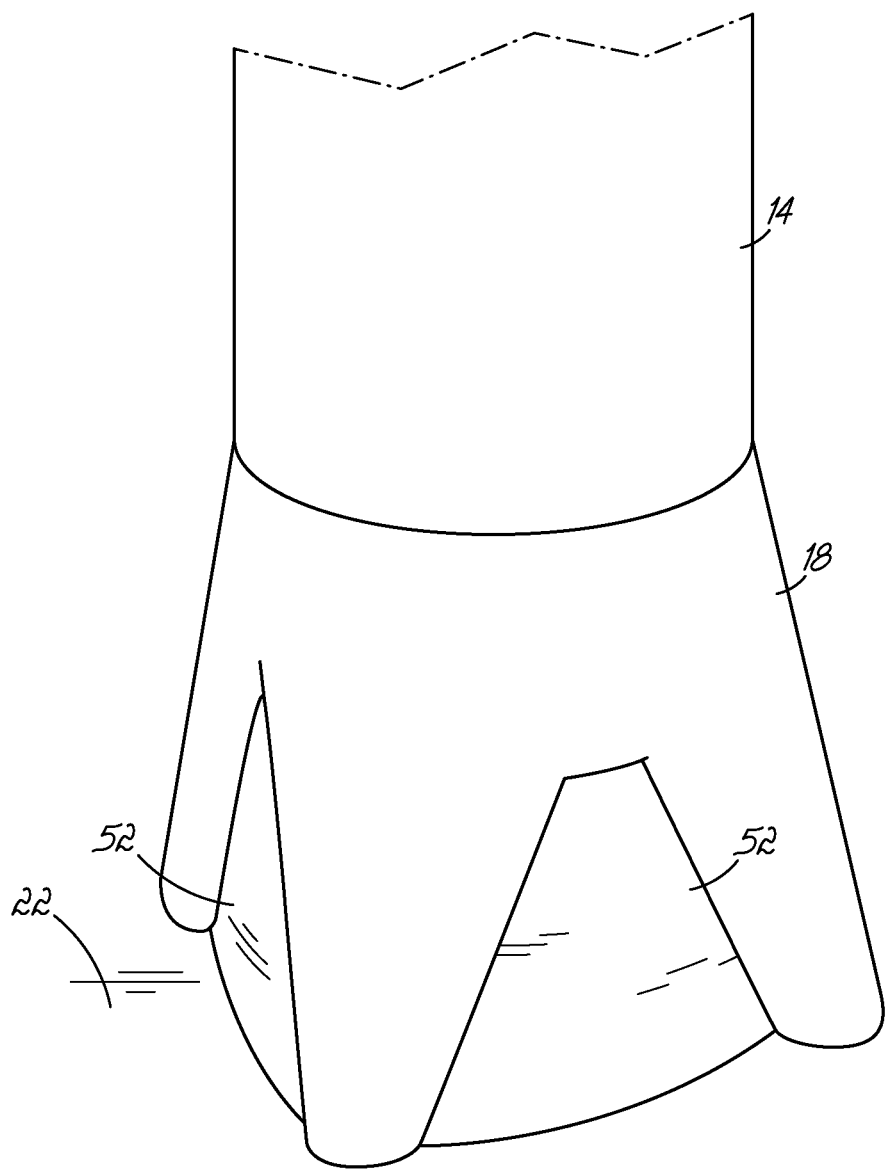
FIG. 6 is a view of a transition piece and a lower portion of a tower, showing a cover for openings on the transition piece.

FIG. 6 shows yet another embodiment of the invention that includes covers 52 on at least some of the lateral openings between the space beneath the tower and other portions of the deck. The covers may seal the space beneath the tower from the elements, or at least prevent the ingress of wind and the like. According to one embodiment, the openings are covered with formed, fiberglass plates that are shaped and sized to mate with the perimeter of the openings and to be removable, if needed, to remove or replace a module. The covers may include a seal that helps prevent the ingress of moisture and/or air. The openings may also include a doorway to allow the passage of personnel or smaller components. It is to be appreciated that fiberglass covers are but one type of panel that may be used to cover openings to the space below the tower, and that others are possible and are contemplated, including aluminum covers, plastic covers and the like.

According to another embodiment, a cylindrical extension (not shown) of the tower extends into the space below the interface between the tower and the transition piece. In such an embodiment, the transition piece is still providing a substantial amount of the transfer of force between the tower and the foundation that supports the tower, and in this respect, the lower end of the tower is to be considered to be at the interface between the tower and transition piece rather than along anything that extends downward of the structural transition between the transition piece and the tower.

The phraseology and terminology used herein is for the purpose of description and should not be regarded as limiting. The use of "including", "comprising", "having", "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of this description invention. Accordingly, the foregoing description is by way of example only, and is not intended as limiting. The invention(s) are limited only as defined by the following claims and the equivalents thereto.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. For example, although aspects of the invention are shown described above with reference to a jacket type foundation, aspects of the invention may be used with any type of foundation, including various types of monopole foundations, gravity based foundations, tension leg foundations, and even floating foundations or onshore installations. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A wind turbine construction, comprising:
a tower having an upper end that supports a nacelle and rotor of a wind turbine and a lower end that includes a structural jacket, the structural jacket defining an interior space having an interior cross-sectional area and an external environment of the wind turbine;
a first removable electronics module positioned within the interior space of the tower;
a support structure that supports and elevates the tower to provide a space below the lower end of the tower for receiving the first removable electronics module from the interior space of the tower, wherein the lower end of the tower includes a downwardly facing opening through which the first removable electronics module may pass, and wherein the support structure includes at least one lateral opening that leads from the space below the lower end of the tower to the external environment; and
a cover for covering the at least one lateral opening to seal the space below the lower end of the tower.

2. The wind turbine construction of claim 1, wherein the cover has a first position covering at least one lateral opening and a second position exposing the at least one lateral opening.

3. The wind turbine construction of claim 1, wherein the cover is removable.

4. The wind turbine construction of claim 1, wherein the at least one lateral opening includes a doorway.

5. The wind turbine construction of claim 1, further comprising a deck adjacent the at least one lateral opening for receiving the first removable electronics module in the external environment.

6. The wind turbine construction of claim 1, wherein the support structure includes a plurality of lateral openings that lead from the space below the lower end of the tower to the external environment.

7. The wind turbine construction of claim 1, further comprising:
a mechanical lift that extends from within the interior space of the tower at least to the bottom of the tower.

8. The wind turbine construction of claim 7, wherein the mechanical lift extends into the space below the lower end of the tower.

9. The wind turbine construction of claim 1, further comprising:
a hoisting mechanism that is adapted to hoist the first electronics module between the interior space of the tower and the space below the bottom of the tower.

10. The wind turbine construction of claim 1, wherein the support structure that supports and elevates the tower is mounted to an offshore foundation for the wind turbine.

11. The wind turbine construction of claim 1, wherein the first removable electronics module includes at least one of a transformer, a converter, a wind turbine controller, or a switch gear.

12. The wind turbine construction of claim 1, wherein the lower end of the tower defines an interface and an upper end of the support structure defines an interface, and wherein the tower and the support structure are mated together at their respective interfaces.

13. A method of servicing electronics of a wind turbine, comprising:
providing a wind turbine tower having an upper end that supports a nacelle and a rotor of the wind turbine, a lower end having a downwardly facing opening, and a tower axis extending therebetween, the lower end including a structural jacket that defines an interior space;
releasing a first removable electronics module from a fixed position within interior space of the wind turbine tower;
moving the first removable electronics module downward through the interior space of the tower in a direction generally parallel to the tower axis and through the downwardly facing opening in the lower end of the tower to locate the first removable electronics module within a support structure that supports and elevates the tower;
wherein the support structure includes at least one lateral opening having a cover for sealing the space below the lower end of the tower, the method further comprising:
moving the cover to expose the at least one lateral opening in the support structure; and
moving the first removable electronics module through the at least one lateral opening in the support structure to locate the first removable electronics module in an external environment of the wind turbine.

14. The method of claim 13, wherein moving the cover to expose the at least one lateral opening further comprises removing the cover to expose the at least one lateral opening.

15. The method of claim 13, further comprising receiving the first removable electronics module on a deck adjacent the at least one lateral opening in the external environment.

16. The method of claim 13, further comprising:
opening a passageway through the downwardly facing opening in the lower end of the tower that is sized to allow the first removable electronics module to pass therethrough.

* * * * *